United States Patent
Zhang

(10) Patent No.: US 9,327,373 B2
(45) Date of Patent: May 3, 2016

(54) PREFORM CLAMPING HEAD

(75) Inventor: Jiesheng Zhang, Guangdong (CN)

(73) Assignee: GUANGZHOU TECH-LONG PACKAGING MACHINERY CO., LTD., Guangzhou (CN)

( * ) Notice: Subject to any disclaimer, the term of this patent is extended or adjusted under 35 U.S.C. 154(b) by 358 days.

(21) Appl. No.: 13/641,613

(22) PCT Filed: Mar. 30, 2011

(86) PCT No.: PCT/CN2011/000551
§ 371 (c)(1),
(2), (4) Date: Dec. 17, 2012

(87) PCT Pub. No.: WO2012/100386
PCT Pub. Date: Aug. 2, 2012

(65) Prior Publication Data
US 2013/0087964 A1    Apr. 11, 2013

(30) Foreign Application Priority Data

Jan. 28, 2011   (CN) .......................... 2011 1 0031050

(51) Int. Cl.
*B23Q 3/00* (2006.01)
*B29C 49/42* (2006.01)

(52) U.S. Cl.
CPC .............. *B23Q 3/00* (2013.01); *B29C 49/4205* (2013.01)

(58) Field of Classification Search
USPC ......................................................... 269/287
See application file for complete search history.

(56) References Cited

U.S. PATENT DOCUMENTS

| | | | | |
|---|---|---|---|---|
| 5,029,718 A * | 7/1991 | Rizzardi | ............ | B65D 55/0863 206/222 |
| 5,593,028 A * | 1/1997 | Haber | .................... | A61J 1/2093 206/219 |
| 5,769,476 A * | 6/1998 | Lawn | .................. | B29C 49/4205 198/803.12 |
| 5,850,947 A * | 12/1998 | Kim | .................... | B05B 11/0059 222/321.4 |
| 5,921,416 A * | 7/1999 | Uehara | .................... | B29C 49/18 215/12.1 |
| 6,247,995 B1 * | 6/2001 | Bryan | .................... | A23G 3/366 124/74 |
| 6,305,576 B1 * | 10/2001 | Leoncavallo | ....... | B65D 51/2814 206/222 |
| 7,021,921 B2 * | 4/2006 | Zoppas | ............... | B29C 49/4205 198/803.7 |
| 7,210,575 B2 * | 5/2007 | Oswald | .............. | B65D 51/2885 206/219 |
| 7,607,592 B1 * | 10/2009 | Kim | ....................... | A01G 25/14 239/376 |
| 7,740,134 B2 * | 6/2010 | Sweeney, Jr. | ...... | B65D 51/2864 206/221 |
| 7,832,184 B2 * | 11/2010 | Sillince | .............. | B65D 81/3222 206/219 |

(Continued)

FOREIGN PATENT DOCUMENTS

CA    2398920 A1    2/2003
CN    2621912 Y     6/2004

(Continued)

*Primary Examiner* — Lee D Wilson
*Assistant Examiner* — Alvin Grant
(74) *Attorney, Agent, or Firm* — Lucas & Mercanti, LLP; Peter J. Phillips

(57) ABSTRACT

A preform clamping head which is mounted at the lower part of a heating chain (8) includes an integral annular sleeve body (1), the outer surface of which inclines outwardly from bottom to top and the upper part of which is provided with a retracting space (2) for the inward retracting of the annular sleeve body when it is pressed. The invention has simple manufacture process and low manufacture cost. By means of the integral molding mode, the axial requirement of the preform clamping head is easier to satisfy, so that the bottle preform clamped on the outer surface of the sleeve body is capable of rotating stably along the heating chain and can be heated more uniformly during the heating process.

9 Claims, 5 Drawing Sheets

(56) References Cited

U.S. PATENT DOCUMENTS

| | | | | |
|---|---|---|---|---|
| 7,857,134 B2 * | 12/2010 | Koch | ............... | A61J 7/04 206/459.1 |
| 7,874,420 B2 * | 1/2011 | Coon | ............... | B65D 81/3222 206/219 |
| 7,951,109 B2 * | 5/2011 | Anderson | ............... | A61J 1/1412 206/222 |
| 8,083,056 B1 * | 12/2011 | Wu | ............... | B65D 25/08 206/221 |
| 8,356,711 B2 * | 1/2013 | Canziani Hoffa | ............... | B65D 47/243 206/222 |
| 8,960,424 B1 * | 2/2015 | Anderson | ............... | B65D 51/2835 206/219 |
| 2003/0213709 A1 * | 11/2003 | Gibler | ............... | B65D 51/2842 206/219 |
| 2006/0014272 A1 * | 1/2006 | Tajima | ............... | B01L 3/0275 435/287.6 |

FOREIGN PATENT DOCUMENTS

| | | |
|---|---|---|
| CN | 2614884 Y | 12/2004 |
| CN | 100384614 C | 4/2008 |
| CN | 201942312 U | 8/2011 |

* cited by examiner

PREFORM CLAMPING HEAD

The present application is a 371 of International application PCT/CN2011/000551, filed Mar. 3, 2011, which claims priority of CN 201110031050.2, filed Jan. 28, 2011, the priority of these applications is hereby claimed and these applications are incorporated herein by reference.

TECHNICAL FIELD

This invention relates to a preform clamping head, especially which used in the blowing-filling-capping combi-block (BFC combi-block) for clamping the bottle preform.

BACKGROUND OF THE INVENTION

In order to save material and respond to the call of the national energy saving, the beverage industry has launched "lightweight packaging", utilizing lightweight bottles to package carbonated soft drinks and purified water and other drinking water, as the lightweight bottle shown in FIG. 1. It includes the bottle body 100 and the cap 200 connected together with screw thread. Cap 200 is provided with a downward seal ring 210, whose outer diameter on the upper part is slightly larger than the inner diameter of the bottle mouth 110. With its lower end tilting inward, after capping, seal ring 210 will insert inside the bottle mouth 110, and sealing of the lightweight bottle will be achieved with the outer surface of sealing ring 210 and the inner wall of the bottle mouth 110 against each other. Therefore, no gap (for example, that due to abrasions of the bottle inner wall) is allowed at the location where the outer surface of sealing ring 210 and the inner wall of the bottle mouth 110 against each other, or the seal of the lightweight bottle will be harmed, resulting in leakage and scrapped product.

In order to achieve mass production, BFC combi-block has been used to practice lightweight packaging for drinking water in the market, i.e. BFC combi-block can in turn finish processes of blow molding, filling and capping. Before blow molding, the bottle preform shall be heated, for which the preform clamping head on the lower end of the heating chain is inserted into the bottle mouth 110 and the bottle is clamped with it quickly, and the bottle preform driven by the heating chain is rotated through the heating zone, heated by a heating device and then passed to blow molding zone for blow molding. In order to ensure uniform wall thickness resulted, the preform shall be heated evenly. In order to ensure a good seal of the lightweight bottle, the preform clamping head shall not bring any damage to the bottle mouth when it is inserted into the bottle mouth 110 quickly, otherwise it will harm the seal of the packaging of the lightweight bottle.

FIG. 2 shows the preform clamping head made by existing technology, which includes the heating head 12 attached to the lower end of the insert head 11, both of which are connected to the sleeve shaft 14 by the screw 13. Multiple circularly-arranged mounting grooves 15 are provided between the insert head 11 and the heating head 12. In the mounting groove 15, there equipped with stainless steel expanding plate 16, which can slip along the radial direction of heating head 12 in the mounting groove 15. At the location on the outer wall of heating head 12 corresponding to the stainless steel expanding plate 16 is provided rubber ring 17, with which the stainless steel expanding plate 16 contacts heating head 12 elastically. During operating, the preform clamping head carried by heating chain 10 which is driven by power unit goes downward. When stainless steel expanding plate 16 contacts the mouth of the bottle preform, the stainless steel expanding plate 16 under force will slide inward and squeeze the rubber ring 17 to allow the preform clamping head to go down further. When the preform clamping head reaches the preset position, the heating chain 10 will stop going down, the stainless steel expanding plate 16 will stick tightly to the mouth of the bottle preform due to the elasticity of the rubber ring 17, so that the heating chain 10 will transport the bottle preform to the heating zone in rotating way. Since the upper surface of the bottle mouth contacts the lower surface of discharging ring 18, the bottle preform may be released by pulling the sleeve shaft 14 upwards when heating is completed.

However, there are some shortcomings in the preform clamping head under the existing technology: 1. The preform clamping head is assembled from multiple parts, which have to be processed separately, leading to cumbersome processing operations and high cost; 2. The matching accuracy of parts processed separately is difficult to control. The stainless steel expanding plate 16 after assembling is hard to be uniformly distributed around the axis of rotation of the heating chain 10, resulting in deviation of axis of the bottle preform stuck outside the stainless steel expanding plate 16 from the rotation axis of heating chain 10, leading to uneven heating of the bottle preform due to the shaking and thereby harming the quality of blow molding; 3. When assembling the preform clamping head to the sleeve shaft 14, it is necessary to join the insert head 11 to the heating head 12 and attach all stainless steel expanding plate 16 to it firstly and it is quite troublesome indeed; and 4. Since the hardness of the stainless steel expanding plate 16 is much larger than that of the bottle preform made of PET, the stainless steel expanding plate 16 is apt to abrade the bottle inner wall when the preform clamping head is inserted quickly into the bottle mouth, harming the seal of packaging of the lightweight bottle. And the abrasion will be exacerbated with the temperature rise of the stainless steel expanding plate 16.

SUMMARY OF THE INVENTION

The purpose of this invention is to provide a preform clamping head, which is full of stable rotation and easy installation with simple manufacture process and low manufacture cost. The further purpose of it is to significantly reduce the probability of abrasion of the bottle mouth.

The preform clamping head described in this invention is mounted at the lower part of the heating chain It includes an integral annular sleeve body, the outer surface of which inclines outwardly from bottom to top and the upper part of which is provided with a retracting space for the inward retracting of the annular sleeve body when it is pressed.

The annular sleeve body described in this invention is made of engineering plastic. The preform clamping head of the present invention is equipped with an annular sleeve body, whose outer surface inclines outwardly from bottom to top. The preform clamping head driven by the heating chain may insert downward into the bottle mouth, and press the upper part of the annular sleeve body simultaneously to make it retract inward, allowing the preform clamping head to go downward further. When the heating chain stops going down, the outer surface of the upper part of the annular sleeve body and the bottle mouth will press against each other, making the annular sleeve body stick to the inner surface of the bottle mouth. Since the integral structure of the annular sleeve body, this invention has very simple manufacture process and low manufacture cost compared with that of the existing technology in which corresponding parts are processed separately and then assembled together. Especially, by means of the integral molding mode, the axial requirement of the preform clamping head is easier to be satisfied, so that the bottle preform clamped on the outer surface of the sleeve body is capable of rotating stably along the heating chain and can be heated more uniformly during the heating process. In addition, the annular sleeve body adopts engineering materials, so its surface is smooth and its hardness is similar to the bottle preform, so the probability of abrasion of the bottle mouth can be reduced significantly.

PREFERRED EMBODIMENTS

As shown in FIGS. 2 to 5, the preform clamping head of the invention is installed in the lower part of a heating chain 8. It includes an integral annular sleeve body 1, the outer surface of which inclines outwardly from bottom to top in the shape an arc or a straight line, and the upper part of which is provided with a retracting space 2 for the inward retracting of the annular sleeve body 1 when it is pressed. The preform clamping head driven by the heating chain 8 may insert downward into the bottle mouth, and press the upper part of the annular sleeve body 1 simultaneously to make it retract inward, allowing the preform clamping head to go downward further. When the heating chain 8 stops going down, the outer surface of the upper part of the annular sleeve body 1 and the bottle mouth will press against each other, making the annular sleeve body 1 stick to the inner surface of the bottle mouth. Due to the integral structure of the annular sleeve body 1, this invention has very simple manufacture process and low manufacture cost compared with that of the existing technology in which corresponding parts are processed separately and then assembled together. Furthermore, by means of the integral molding mode, the axial requirement of the preform clamping head is easier to be satisfied, so that the bottle preform clamped on the outer surface of the sleeve body is capable of rotating stably along the heating chain 8 and can be heated more uniformly during the heating process. The releasing mode of the preform clamping head is the same as that of the existing technology.

Figure 5:
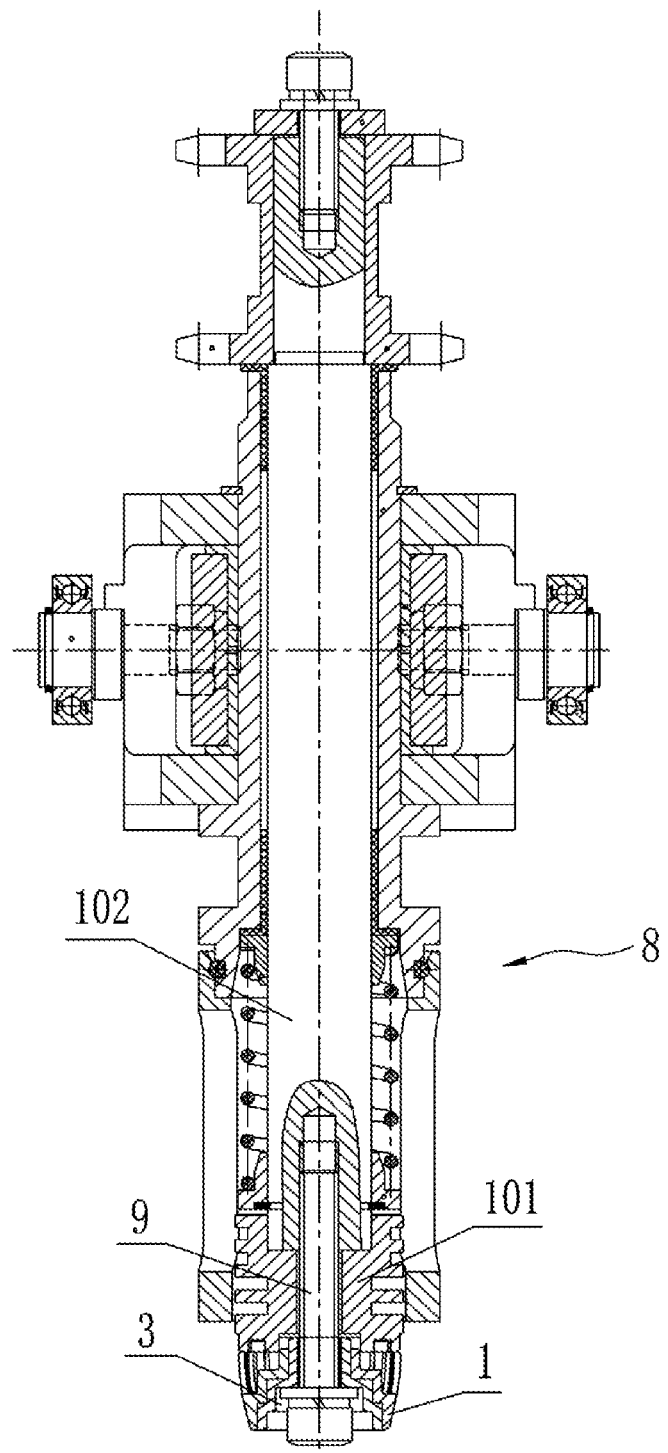
FIG. 5 is the state diagram of the use of the invention.

The preform clamping head may be installed on the heating chain 8 by a variety of installation methods. As shown in FIG. 5, within the annular sleeve body 1 is provided mounting holes 3, which may be stepped holes. The shaft of the bolt 9 goes through mounting holes 3 and the insert head 101 in turn and then attaches to the sleeve shaft 102 immediately, the nut of which presses against the step surface of the mounting hole 3. Certainly, the preform clamping head can be attached to the heating chain 8 by any other existing installation methods.

Figure 1:
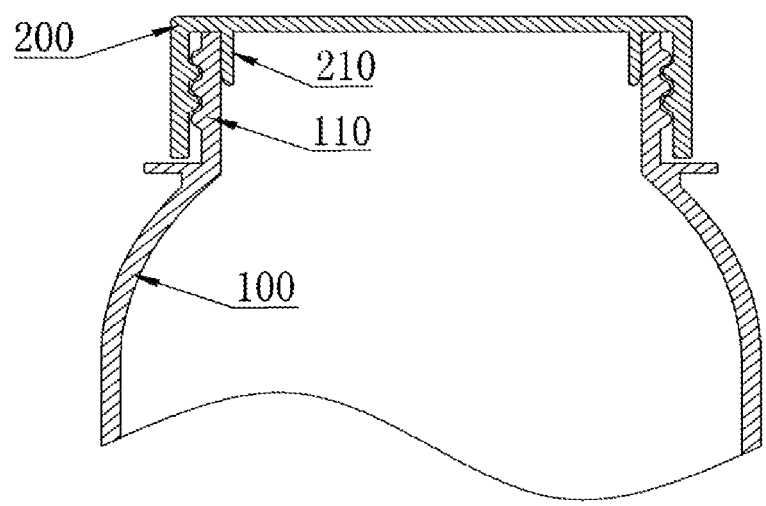
FIG. 1 is the schematic diagram of the structure of the lightweight bottles.
Figure 2:
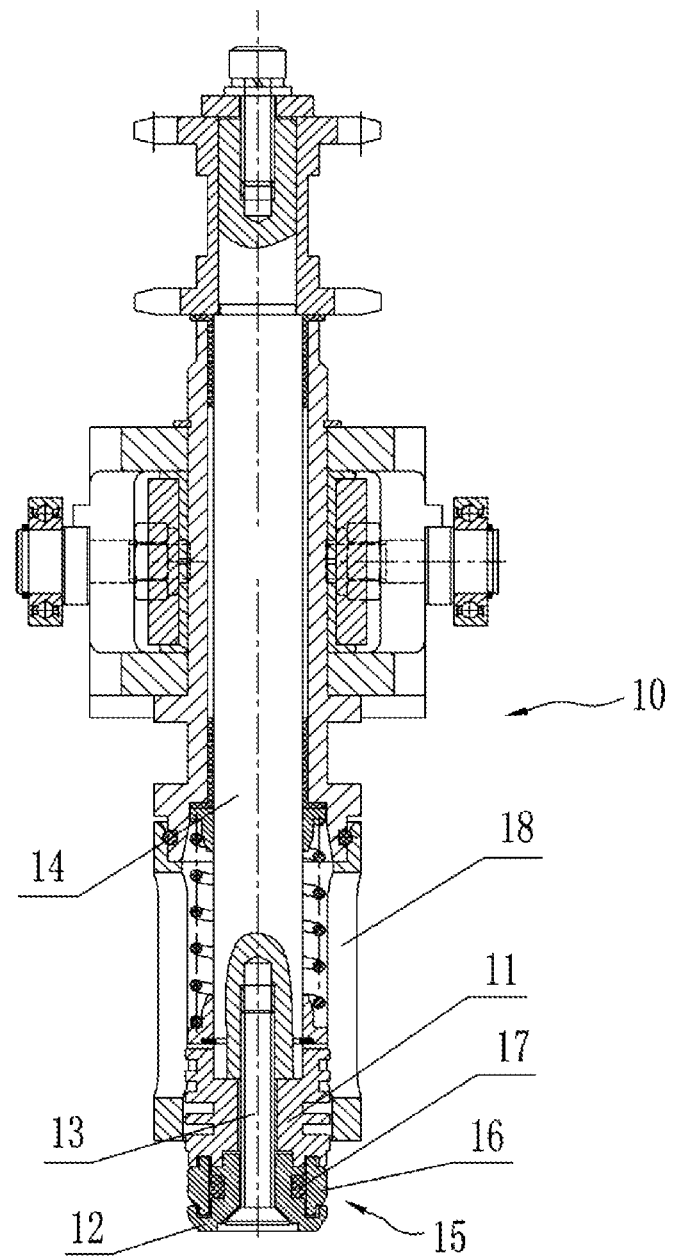
FIG. 2 is the state diagram of the use of existing technology.
Figure 3:
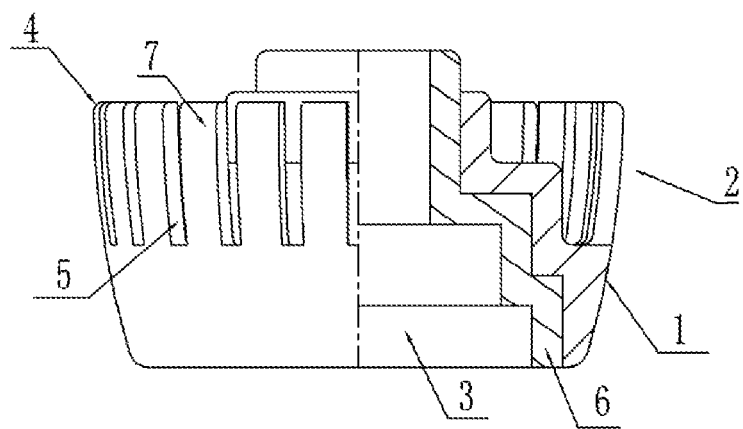
FIG. 3 is the semi-cutaway schematic diagram of the invention.
Figure 4:
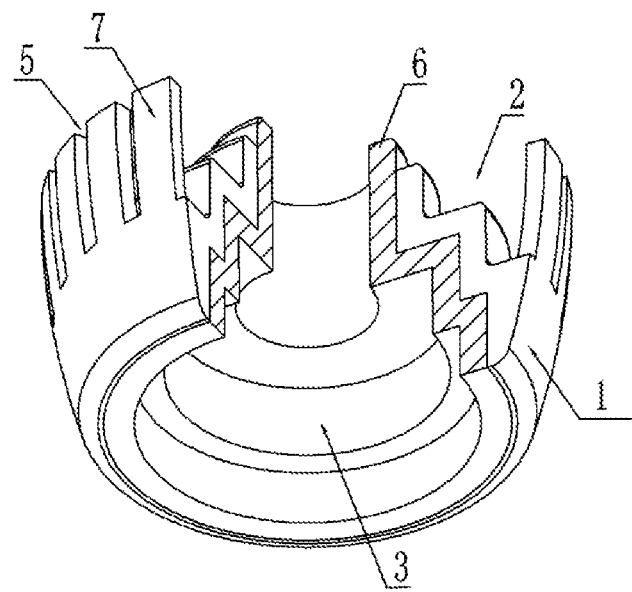
FIG. 4 is the semi-profile three-dimensional schematic diagram of the invention.

For better perform releasing, there is an arc 4 for transition between the outer surface and the upper surface of the annular sleeve body 1 as shown in FIG. 3.

As shown in FIG. 3, at the location corresponding to the retracting space 2 on the upper part of the annular sleeve body 1 is provided multiple grooves 5 evenly distributed around the axis of the annular sleeve body 1, and between any two adjacent grooves 5 it is separated by racks 7 distributed around the integral annular sleeve body 1 evenly, which grants better elasticity to the upper part of the annular sleeve body 1.

In order to improve the strength of the annular sleeve body 1 and conduct the heat in time out of the annular sleeve body 1, a metal sleeve 6 of good heat dispersion and strength is embedded in the annular sleeve body 1. The metal sleeve 6 can be made of such materials as bronze, aluminum or silver.

The annular sleeve body 1 described is made of engineering plastic, which can be molded by an integral injection molding process. The engineering plastic used may be composite nylon, polyamide esters, or teflon. Products of the engineering materials have smooth surfaces and hardness, which are similar to the bottle perform. Therefore the probability of abrasion of the bottle mouth can be significantly reduced.

The invention claimed is:

1. A preform clamping head mounted at a lower part of a heating chain, characterized by including an integral annular sleeve body, an outer surface inclining outwardly from bottom to top and an upper part of which having a retracting space for the inward retracting of the annular sleeve body when the annular sleeve body is pressed, and wherein multiple longitudinal grooves are provided at a location corresponding to the retracting space on the upper part of the annular sleeve body and evenly distributed around an axis of the annular sleeve body, and between any adjacent grooves, racks are distributed around the annular sleeve body evenly.

2. The head according to claim 1, wherein inside the annular sleeve body, there are provided mounting holes.

3. The head according to claim 1, wherein an arc for transition is provided between an outer surface and the upper surface of the annular sleeve body.

4. The head according to claim 1 wherein a metal sleeve of good heat dispersion and strength is embedded in the annular sleeve body.

5. The head according to claim 4, wherein the metal sleeve is made of bronze, aluminum or silver.

6. The head according to claim 1, wherein the annular sleeve body is made of engineering plastic.

7. The head according to claim 6, wherein the engineering plastic is composite nylon, polyamide esters, or Teflon.

8. The head according to claim 1, wherein the outer surface of the annular sleeve body inclines outwardly from bottom to top in the shape of an arc.

9. The head according to claim 6, wherein the annular sleeve body being integrally molded by injection molding process.

* * * * *